United States Patent [19]
Marano-Ducarne

[11] Patent Number: 5,738,002
[45] Date of Patent: Apr. 14, 1998

[54] SELF-CLEANING ESPRESSO MACHINE ATTACHMENT FOR PRODUCING FROTHED HOT MILK

[76] Inventor: Anthony Marano-Ducarne, 8 Childs La., Old Field, N.Y. 11733

[21] Appl. No.: 743,543

[22] Filed: Nov. 4, 1996

[51] Int. Cl.[6] .................................................. A47J 31/40
[52] U.S. Cl. ..................... 99/293; 99/323.1; 261/DIG. 76
[58] Field of Search ...................... 99/293, 287, 323.1; 261/DIG. 76

[56] References Cited

U.S. PATENT DOCUMENTS

| | | | |
|---|---|---|---|
| 4,960,042 | 10/1990 | Grossi | 99/293 |
| 5,295,431 | 3/1994 | Schiettecatte et al. | 99/293 |
| 5,464,574 | 11/1995 | Mahlich | 99/293 X |

*Primary Examiner*—Reginald L. Alexander
*Attorney, Agent, or Firm*—Galgano & Burke

[57] ABSTRACT

An attachment for combining steam, milk and air which comprises an upper frother body having an upper end defining an inlet and a lower frother body having a lower end defining a discharge outlet. The upper and lower frother bodies are attached to each other so as to establish a fluid passageway between the inlet and the outlet. A frother nozzle is interdisposed in fluid passageway between the inlet and discharge outlet. A manifold attaches to the upper frother body for introducing milk and air into the fluid passageway. A pressure cap, a rigid bushing and a resilient bushing allow releasably attaching of the inlet to a steam supply of an espresso machine. A flush cap releasably attaches to the lower end of the lower frother body to close the discharge outlet so that the steam supply from the espresso machine is directed through the manifold in a reverse flow-like flushing manner whereby the attachment is cleaned without requiring disassembly or disconnection from an espresso machine.

13 Claims, 5 Drawing Sheets

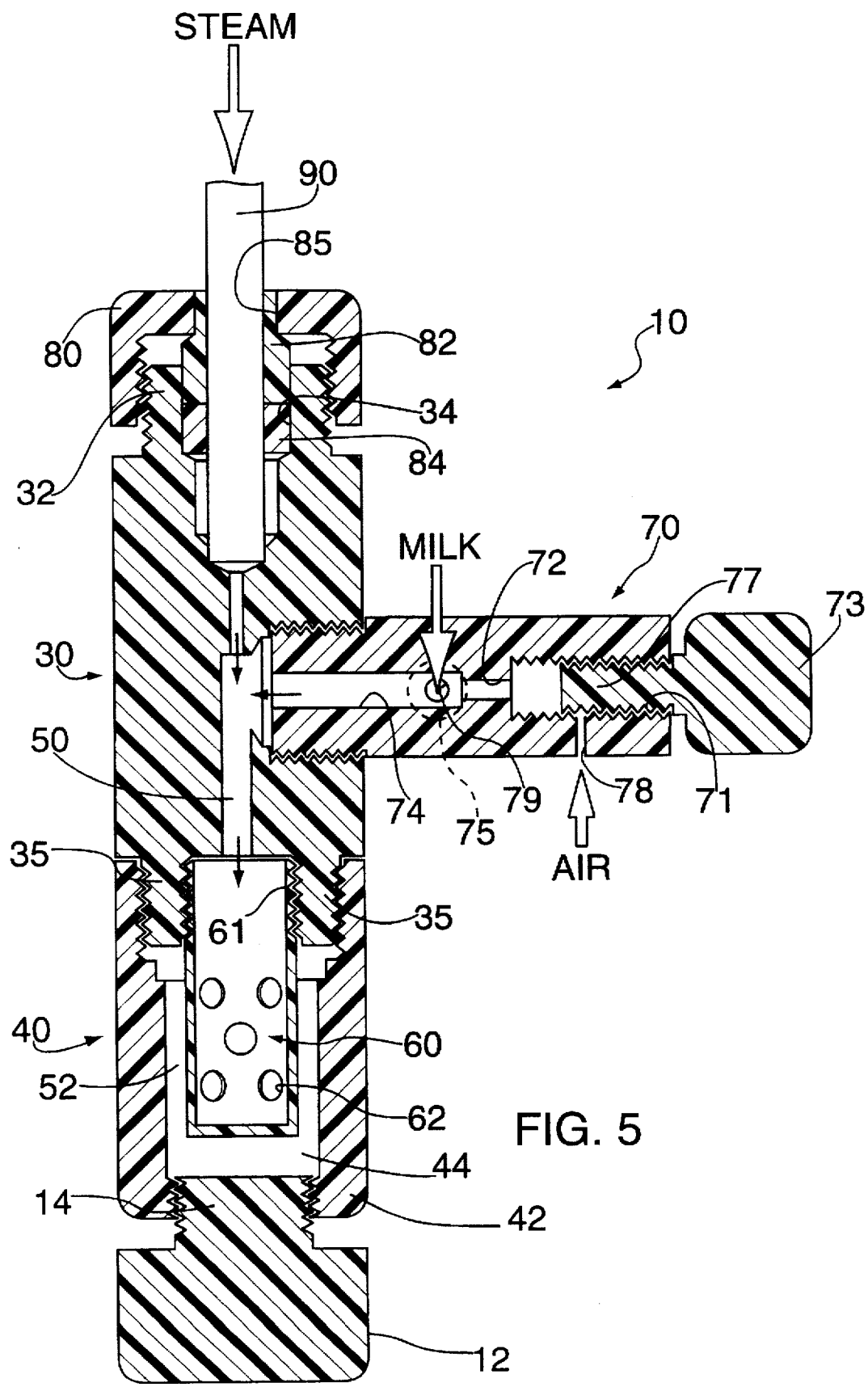

SELF-CLEANING ESPRESSO MACHINE ATTACHMENT FOR PRODUCING FROTHED HOT MILK

BACKGROUND OF THE INVENTION

The present invention relates generally to devices for frothing milk. More specifically, the present invention relates to a self-cleaning espresso machine attachment for combining steam, milk and air to produce frothed hot milk.

While prior art devices which attach to an espresso machine are generally suitable for combining steam, milk, and air to produce frothed hot milk, they exhibit the drawback that in order to be cleaned they must be removed from an espresso machine and disassembled. This is because the steam drys milk residue inside the device which forms a crust and clogs the air intake opening rendering the device unusable until it is cleaned. Often, even after only a short period of non-use, these devices must be rinsed or left submerged in water.

Another drawback with prior art devices which attach to espresso machines for producing frothed hot milk is that such devices are designed to attach directly to a steam valve of an espresso machine. In particular, this limits the amount of space provided for placing a cup underneath the devices. For example, U.S. Pat. No. 5,330,266 to Stubaus discloses a cappuccino attachment that includes a steam valve attachment mechanism that is fitted directly onto a steam valve of an espresso machine, i.e., where a steam tube would normally extend from, which causes the cappuccino attachment to be located directly over a drain grating of the espresso machine. This positioning provides only enough space for a relatively small sized cup to be seated on the grating in order to receive the frothed hot milk as it is discharged from the cappuccino attachment. In many applications, a relatively large sized cup or other suitable container is preferred by an end user. Also, the cappuccino attachment of Stubaus is designed to fit only steam valves having a ball joint-like connection, e.g., European manufactured espresso machines, limiting it from being used on espresso machines which have a swing arm-like steam tube.

Thus, there is a need for espresso machine attachments for producing frothed hot milk in which the attachments are self-cleaning and readily attachable to the different steam supply outlets of espresso machines.

SUMMARY OF THE INVENTION

Accordingly, it is an object of the present invention to provide a novel self-cleaning espresso machine attachments for producing frothed hot milk in which the attachments are configured to utilize the supply of steam to provide a flushing action in order to clean the attachment.

It is another object of the present invention to provide such self-cleaning espresso machine attachments which can be easily cleaned without requiring the attachments to be disconnected from an espresso machine and disassembled thereby reducing the downtime typically associated with prior art attachments for producing frothed hot milk.

It is also an object of the present invention to provide such self-cleaning espresso machine attachments which are readily attachable to most espresso machines having either a swing arm-like steam tube or a ball joint-like connection for supplying steam.

It is still another object of the present invention to provide such self-cleaning espresso machine attachments which can be positioned at various locations relative to a drain grating of an espresso machine so that different sized cups and containers can be used.

It is a further object of the present invention to provide such self-cleaning espresso machine attachments which reduce the chance of an operator being burned by touching the attachments, as well as the likelihood of burning the milk when preparing frothed hot milk.

Certain of the foregoing and related objects are readily attained in self-cleaning espresso machine attachments for combining steam, milk and air to produce frothed hot milk, in which the attachment comprises an upper frother body having a first fluid conduit formed therethrough and an upper end defining a steam inlet, and a lower frother body coupled to the upper frother body and having a second fluid conduit formed therethrough and a lower end defining a discharge outlet. The first and second fluid conduits of the upper and lower frother bodies are in fluid communication with one another to establish a fluid passageway between the steam inlet and the discharge outlet. A frother nozzle is disposed in the fluid passageway between the steam inlet and the discharge outlet. The attachment also includes means for releasably attaching the steam inlet to a steam supply of an espresso machine, and means for introducing milk and air into the fluid passageway between the steam inlet and the frother nozzle. The means for introducing milk and air comprises a third fluid conduit having a discharge outlet opening into the fluid passageway, an air inlet opening into the third fluid conduit, and a milk inlet opening into the third conduit. The attachment further includes means for releasably closing the discharge outlet whereby the attachment can be cleaned without disassembly or disconnection from the espresso machine by placing the means for releasably closing the discharge outlet in a closed position so that the steam supply from the espresso machine is directed in a reverse flow-like manner through the means for introducing milk and air.

Preferably, the means for releasable closing the discharge outlet comprises a flush cap having a externally threaded end, and the lower end of the frother body is internally threaded so that the flush cap is threadably receivable within the internally threaded lower end of the lower frother body to close the discharge outlet. Desirably, the upper frother body has a counterbored threaded hole for holding the flush cap when not in use and when producing frothed hot milk.

Also preferably, the means for releasably attaching the steam inlet to a steam supply of an espresso machine comprises a pressure fitting cap, a generally rigid bushing, and a generally resilient bushing, and desirably also comprises a adapter and nut wherein the adapter comprises a tube having a ball-shaped end. Advantageously, the means for introducing milk and air comprises an air adjustment knob in adjustable fluid communication between the air inlet and the third fluid conduit for metering the amount of air introduced the said third fluid conduit. The air adjustment knob comprises a threaded stem threadably received in said third fluid conduit and movable between an open and closed position relative to said air inlet so to as control and meter air through said air inlet.

Most preferably, the attachment further comprises a tube for connecting a milk container to the milk inlet, a first flow restrictor having a v-shaped end attachable to an end of the tube for preventing the tube from sealably engaging an inside surface of a milk container, and a second flow restrictor disposed in the tube adjacent to attachment of the tube to the means for introducing milk and air.

Desirably, the upper frother body, the lower frother body, the frother nozzle, the means for introducing milk and air, and the means for releasably closing the discharge outlet are fabricated from a plastic material.

BRIEF DESCRIPTION OF THE DRAWINGS

Other objects and features of the present invention will become apparent from the following detailed description considered in connection with the accompanying drawings which disclose one embodiment of the present invention. It should be understood, however, that the drawings are designed for the purpose of illustration only and not as a definition of the limits of the invention.

In the drawings, wherein similar reference characters denote similar elements throughout the several views:

FIG. 5 is an enlarged cross-sectional view taken along line 5—5 of FIG. 4.

DETAILED DESCRIPTION OF THE PREFERRED EMBODIMENT

Figure 1:
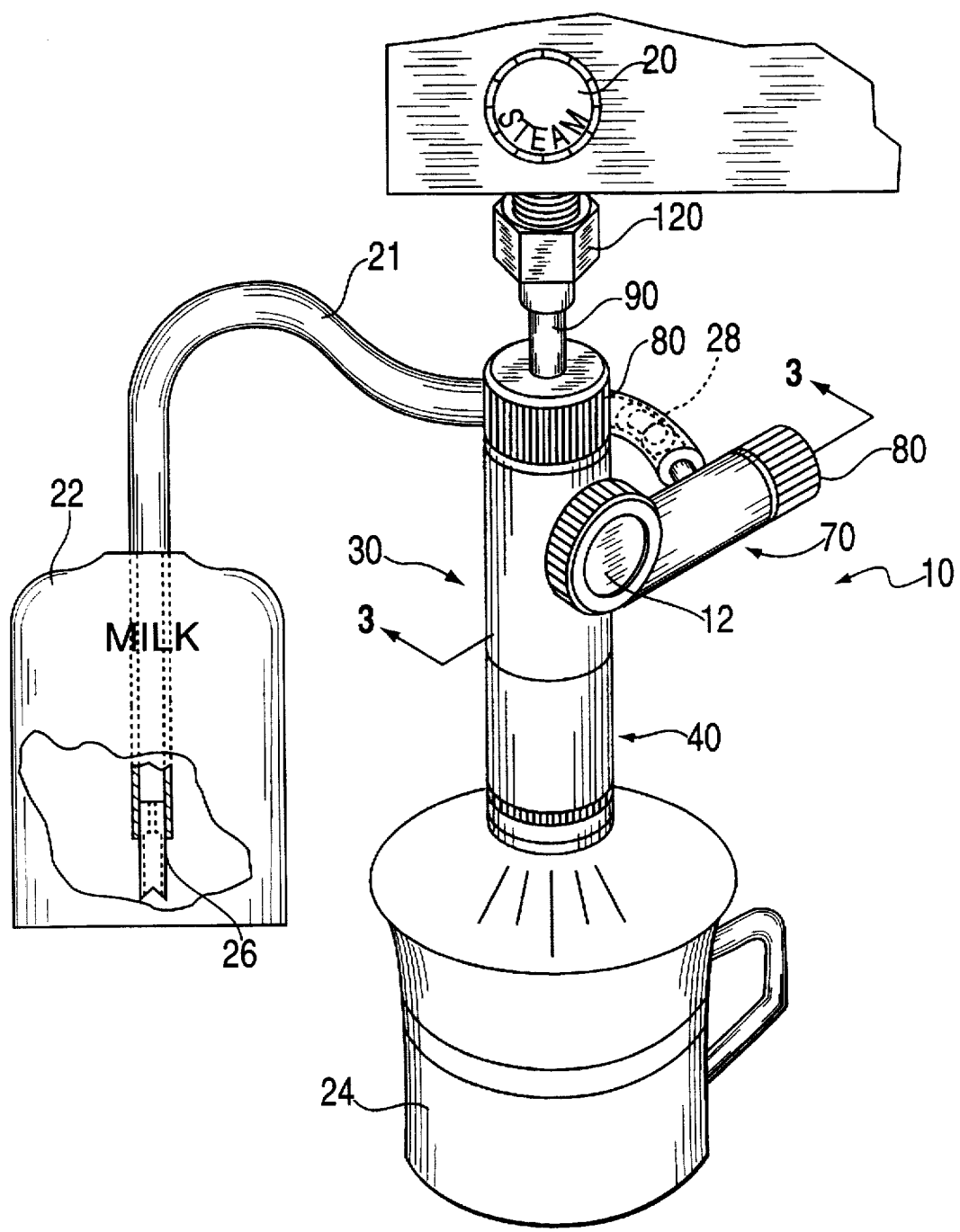
FIG. 1 is a perspective view of one embodiment of the present invention for a self-cleaning espresso machine attachment shown in use in an mounted position on an espresso machine combining steam, milk and air to dispense frothed hot milk into a cup.

Turning now in detail to the drawings, and in particular to FIG. 1, therein illustrated is one embodiment of the present invention which provides a novel espresso machine attachment 10 for combining steam, milk, and air to produce frothed hot milk in which attachment 10 is self-cleaning and adjustably attachable to most types of espresso machines. Attachment 10 generally includes an upper frother body 30 which attaches at an upper end to a supply of steam from an espresso machine via a steam valve 20, an outwardly extending generally cylindrical manifold 70 which receives a supply of milk via tube 21 from a container 22, as well as a supply of air, and a lower frother body 40 from which frothed hot milk is discharged into a cup 24 or the like. Attachment 10 includes a removable flush cap 12 for use in self-cleaning which is described in greater detail below in a self-cleaning operation section.

Figure 2:
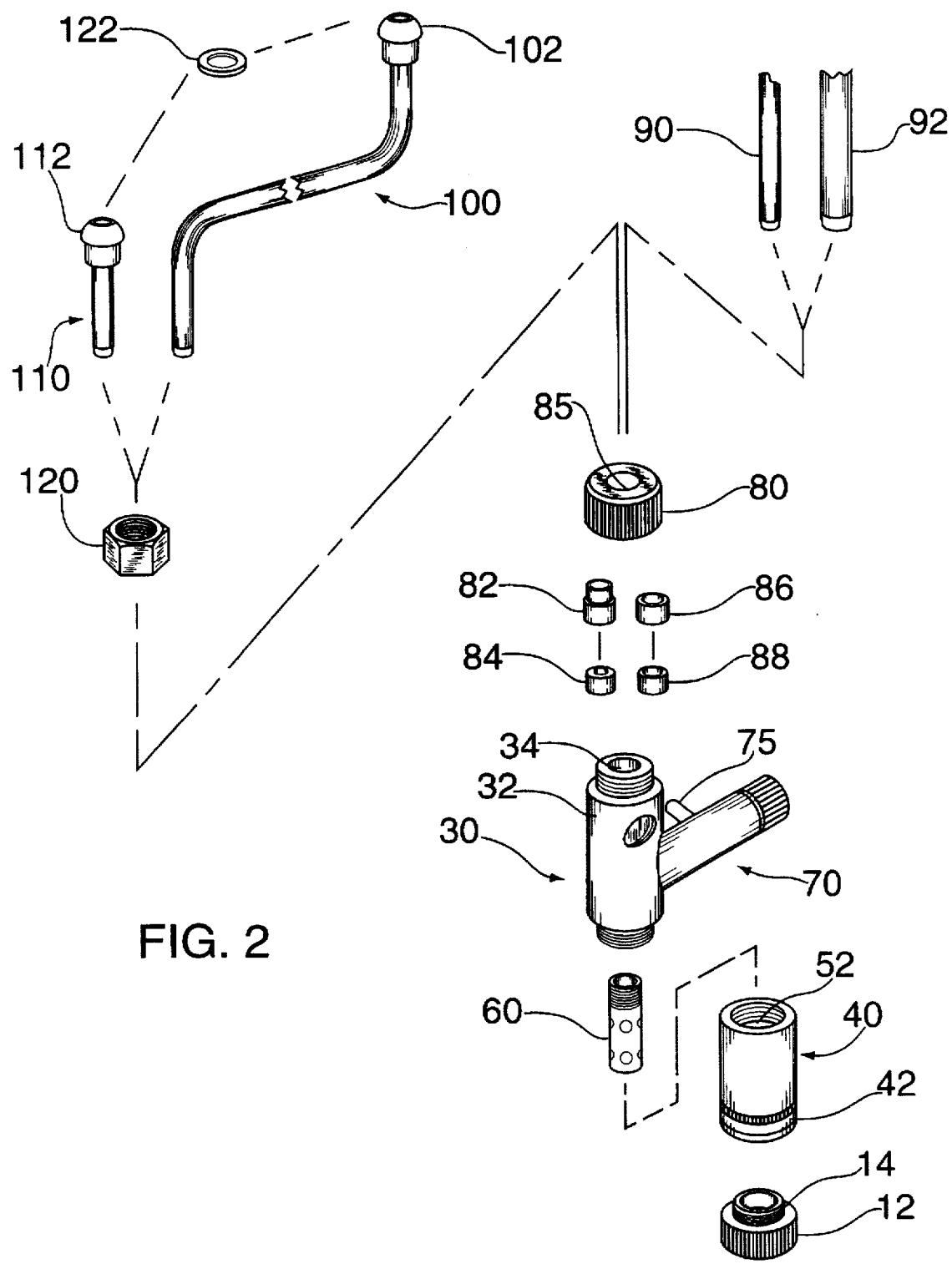
FIG. 2 is an exploded perspective view of the attachment shown in FIG. 1.
Figure 3:
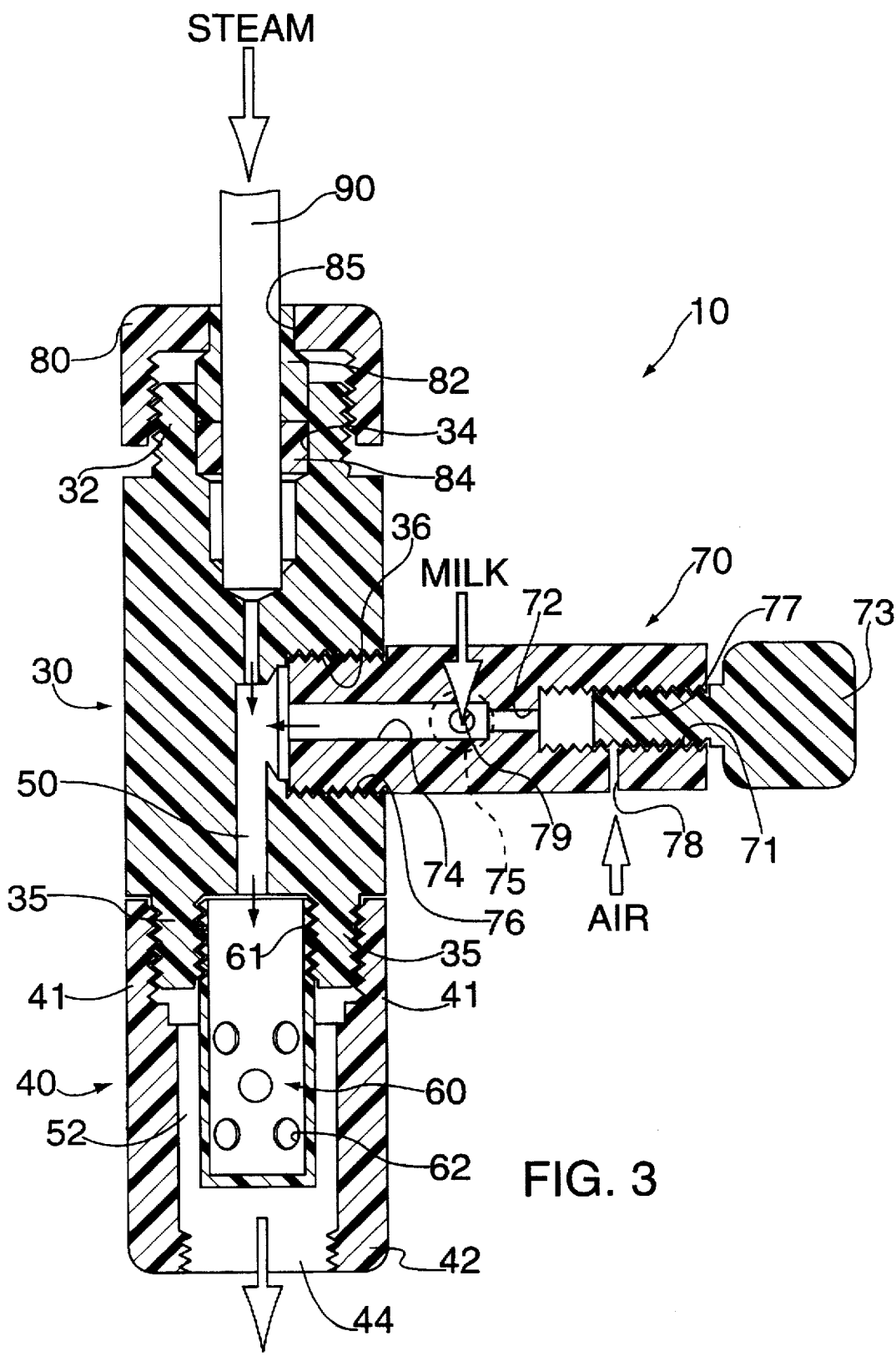
FIG. 3 is an enlarged cross-sectional view taken along line 3—3 of FIG. 1.

As shown in FIGS. 2 and 3, upper frother body 30 is designed to combine and direct steam, milk and air into lower frother body 40. In this illustrated embodiment, upper frother body 30 and lower frother body 40 are generally cylindrically shaped and threadably attachable to each other via the downwardly depending, externally threaded, radially recessed annular flange 35 of upper frother body 30 and the internally threaded upper end 41 of lower frother body 40. In addition, upper frother body 30 has a fluid conduit 50 formed therethrough, and an externally threaded, radially recessed, upper end 32 defining an inlet 34. Lower frother body 40 has a fluid conduit 52 formed therethrough and an internally threaded lower end 42 defining a discharge outlet 44 (FIG. 3). Fluid conduits 50 and 52 are in fluid communication with one another to establish a fluid passageway between inlet 34 and outlet 44.

As shown in FIG. 3, cylindrical manifold 70 has an externally threaded inner end 76 by which it is threadably attached to internally threaded bore 36 of upper frother body 30 for controllably introducing a supply of milk and air to internal passageway 50 between inlet 34 and frother nozzle 60. In particular, manifold 70 includes a generally longitudinally extending fluid conduit 72 having a discharge outlet 74 which opens into passageway 50, a milk inlet 79 which provides for milk intake, an air inlet 78 which provides for air intake, and an internally-threaded outer opening or end 71 in which is threadably receivable, the externally-threaded stem 77 of an air adjustment knob 73. Milk inlet 79 is disposed between air inlet 78 and discharge outlet 74. As best seen in FIG. 2, a short tube or venturi nipple 75 extends from manifold 70 so that milk inlet 79 is attachable to a tube 21 (FIG. 1). The threaded stem 77 of control knob 73 which is threadably fitted in threaded opening 71 regulates the amount of air which is introduced into manifold 70. In particular, by turning control knob 73, the stem 77 of control knob is movable between a closed position and an open position relative to air inlet 78, i.e., air inlet 78 is positioned such that threaded stem 77 of knob 73 reduces the amount of air supplied into manifold 70 as it is screwed in, and increases the amount of air supplied into manifold 70 as it is screwed out.

The design of manifold 70, air inlet 78, and knob 73 decrease the likelihood of air inlet 78 becoming clogged compared to prior art devices having an adjustable knob with a threaded tapered end which is received in an internally threaded conical air inlet which easily clogs (see, for example, U.S. Pat. No. 5,330,266 to Stubaus). Furthermore, the present invention, and in particular air inlet 78 and milk inlet 79, can be easily cleaned by heated steam as described below in the self-cleaning section.

To aid in the frothing of the milk, a cylindrical, cup-shaped frother nozzle 60 is provided. Nozzle 60 has an externally threaded upper end or 61 rim by which it is threadably attachable to the internally threaded recessed circular flange 35 of upper frother body 30 such that it is disposed in the fluid passageway between inlet 34 and discharge outlet 44. Frother nozzle 60 includes a plurality of apertures 62 which serve to aerate and cause frothing of the milk passing therethrough prior to its discharge through outlet 44.

Knob 73 by controlling the amount of air intake also regulates the resulting combined amount of air and milk introduced into passageway 50 which, in turn, affects the consistency of frothed hot milk. In most applications, an operator will prefer a froth of high temperature without burning the milk, as described below in a frothing operation section.

To further regulate the flow of milk, and desirably increase the temperature of the frothed hot milk, a hollow cylindrical flow restrictor 26, shown in FIG. 1, is inserted in the end portion of tube 21 which is placed in milk container 22. Restrictor 26 has a lower V-shaped end which prevents tube 21 from being sealed, by vacuum forces, against the inner bottom surface of milk container 22. The upper end of flow restrictor 26 is provided with a reduced opening therethrough, e.g., 1/16 inch diameter sized hole. An additional flow restrictor 28 is inserted in tube 21 spaced one inch from venturi nipple 75 of manifold 70 which desirably increases the temperature of the milk by 8 to 10 degrees Fahrenheit. For tube 21 having a 1/4 inch inside diameter passageway, flow restrictor 28 is 1/2 inch long and includes an approximately a 3/32 inch diameter hole therethrough.

Inlet 34 of upper frother body 30 is readily attachable to most types of espresso machines for receiving a supply of steam. In addition, attachment 10 can be positioned at various locations relative to a drain grating (not shown) enabling the preparation of frothed hot milk in different sized cups. Also, attachment 10 provides the adaptability to attach to an espresso machine regardless of the manner in which steam is provided, i.e., via a swing arm-like steam tube or a ball joint-like connection. In this illustrated embodiment, attachment 10 readily attaches to espresso machines having a swing arm-like steam tube or to espresso machines having a ball joint-like connection, via a pressure fitting cap 80, a pair of bushings, and an adapter.

As shown in FIGS. 2 and 3, for connecting attachment 10 to an espresso machine having a 6 mm outside diameter swing arm-like steam tube 90, pressure fitting cap 80 and a generally rigid bushing 82 and a generally compressible bushing 84 are used to sealably connect tube 90 to inlet 34 of upper frother body 30. Typically, a nozzle (not shown) disposed at the end of tube 90 is removed or, alternatively, tube 90 is cut to a desired length, upon which tube 90 is inserted through an opening 85 in cap 80. Bushing 82 and bushing 84 are slid onto the end of tube 90 and then inserted into inlet 34 of upper frother body 30 and secured by cap 80. As best seen in FIG. 3, as cap 80 is threadably tightened onto upper end 32 of upper frother body 30, bushing 84 compresses around steam tube 90 and expands against inlet 34 sealably connecting tube 90 to inlet 34 in a leak-tight manner. With reference again to FIG. 2, where an espresso machine has an 8 mm outside diameter swing arm-like steam tube 92, a second set of bushings, 86 and 88, each having an 8 mm inside diameter opening are used instead of bushing 82 and 84. Desirably, bushings 82 and 86 are fabricated from a rigid plastic material such as Delrin, and bushings 84 and 88 are fabricated from a resilient silicone rubber or rubber material.

For connecting attachment 10 to an espresso machine having a ball joint-like connection, adapters 100 or 110 are used. In particular, adapters 100 and 110 have a ball-shaped upper end 102 and 112, respectively, which mates with a socket-like connection on an espresso machine so as to form a ball joint like connection. Depending on the desired positioning of attachment 10 with respect to the espresso machine, either double-elbow shaped adaptor tube 100 or straight adaptor tube 110 is inserted through an opening in a nut 120 and the upper end is sealably attached via an O-ring 122 to a socket-like connection on an espresso machine. The adaptor tube is then attached at its lower end to inlet 34 of upper frother body 30 in the manner explained above.

Frothing Operation

FIG. 1 illustrates the configuration of attachment 10 for combining steam, milk, and air for producing frothed hot milk. Desirable before starting the frothing process, an operator would clean attachment 10 by opening steam valve 20 for several seconds and then closing it. Tube 21 is then inserted in milk container 22, and knob 73 is initially turned clockwise to a closed position and then backed off counter-clockwise to gradually open air inlet 78.

Steam valve 20 of an espresso machine is then slowly opened and the flow of foaming milk is observed. At this point, knob 73 is adjusted to achieve a desired foam thickness and temperature. In particular, knob 73 is turned counter-clockwise to the point where the milk froth starts to spit upon which it is slowly closed until frothed hot milk flows from discharge outlet 44 with an even and muted sound. It should be noted that while a thicker froth will result by not heating the milk too much, too much heat will scald and change the traditional taste when used in cappuccino. Advantageously, knob 73 is adjusted by an operator to achieve a frothed hot milk without scalding the milk.

Self-Cleaning Operation

Figure 4:
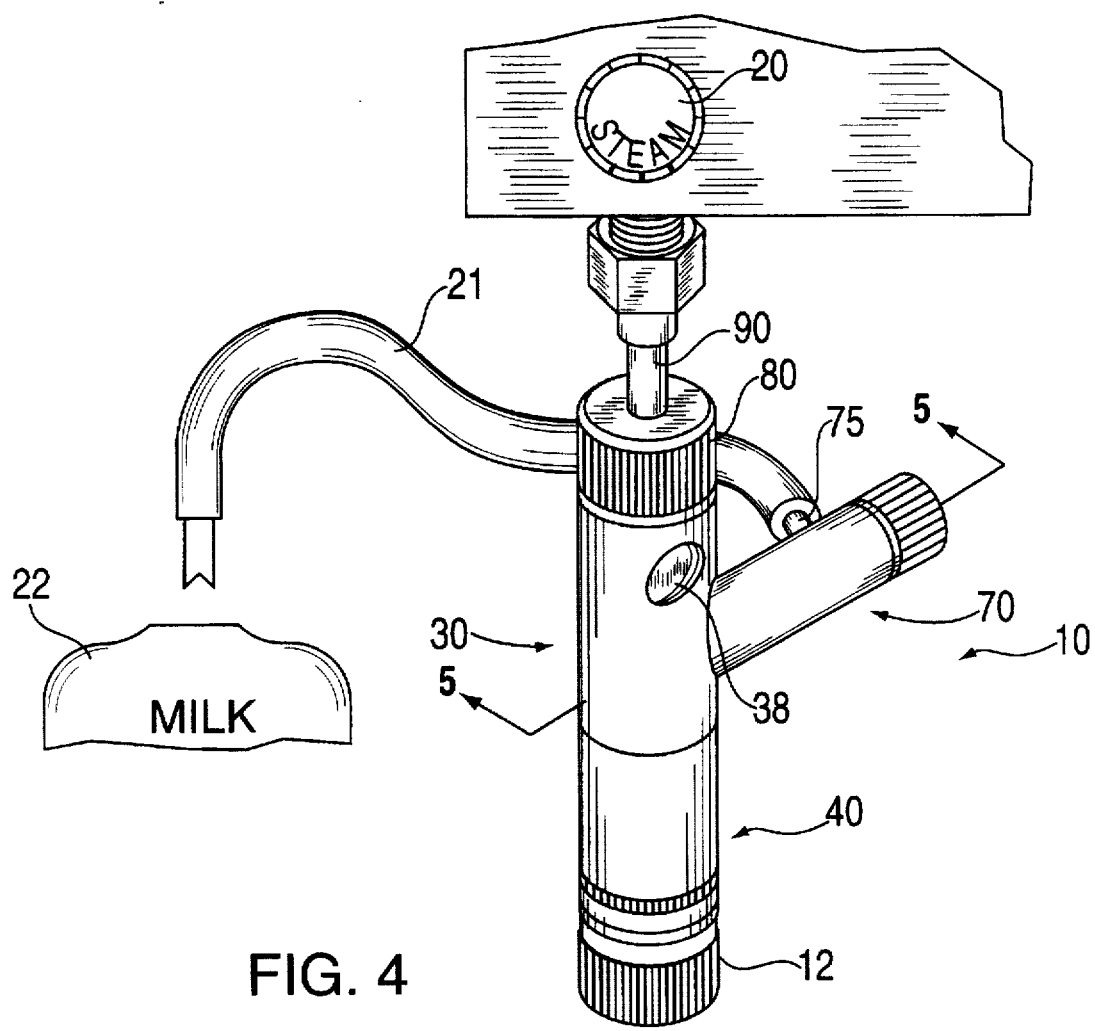
FIG. 4 is a perspective view of the attachment shown in FIG. 1, in which the attachment is reconfigured for self-cleaning.

As pointed out above, the present invention can be readily cleaned without disconnecting it from an espresso machine. With reference to FIGS. 4 and 5, this is accomplished by using the supply of heated stream to flush through attachment 10 and clean attachment 10 at high temperatures.

In this illustrated embodiment, flush cap 12 which has a threaded end 14 (FIG. 5) is removed from upper frother body 30, i.e., from a threaded counterbored hole 38 (FIG. 4) which does not extend into fluid conduit 50, and threaded onto lower end 42 of lower frother body 40. Tube 21 is removed from milk container 22. Steam valve 20 is opened causing steam to be forced through attachment 10 but now instead of flowing out discharge outlet 44 (FIG. 5) in lower frother body 40 steam will flush in a reverse flow-like manner throughout entire attachment 10 and out milk inlet 79, tube 21 and out air inlet 78 of manifold 70, leaving attachment 10 clean and sanitary. Also, by pinching tube 21, additional steam can be made to flush at higher pressure through air inlet 78. At the end of this process, steam valve 20 is closed and flush cap 12 is removed and placed back onto upper frother body 30. Desirably, attachment 10 is cleaned immediately after continuous use has stopped and just before re-use to assure a hygienic operation and consistent results.

Preferably, the various parts of attachment 10, i.e., upper and lower frother bodies 30 and 40, manifold 70, knob 71, are fabricated from a heat resistant plastic that disperses the heat and cools very quickly reducing the likelihood that a user will be burned by touching attachment 10 compared to prior art devices fabricated from metal.

While attachment 10 is illustrated as having upper frother body 30, lower frother body 40, and manifold 70, from the present description it will be appreciated by those skilled in the art that attachment 10 may be fabricated as a one-piece unit, e.g., injected molded as a one-piece unit.

Thus, while only one embodiment of the present invention have been shown and described, it will be appreciated to those skilled in the art that many changes and modifications may be made thereunto without departing from the sphere and scope of the invention.

What it is claimed is:

1. A self-cleaning espresso machine attachment for combining steam, milk and air to produce frothed hot milk, said attachment comprising:

an upper frother body having a first fluid conduit formed therethrough and an upper end defining a steam inlet;

a lower frother body coupled to said upper frother body and having a second fluid conduit formed therethrough and a lower end defining a first discharge outlet, said first and second fluid conduits of said upper and lower frother bodies being in fluid communication with one another to establish a fluid passageway between said steam inlet and said first discharge outlet;

a frother nozzle disposed in said fluid passageway between said steam inlet and said first discharge outlet;

means for releasably attaching said steam inlet to a steam supply of an espresso machine;

means for introducing milk and air into said fluid passageway between said steam inlet and said frother nozzle, said means for introducing milk and air comprising a third fluid conduit having a second discharge outlet opening into said fluid passageway, an air inlet opening into said third fluid conduit, and a milk inlet opening into said third fluid conduit;

means for releasably closing said first discharge outlet;

whereby said attachment can be cleaned without disassembly or disconnection from the espresso machine by placing said means for releasably closing said first discharge outlet in a closed position so that the steam supply from the espresso machine is directed in a reverse flow-like flushing manner through said means for introducing milk and air.

2. The attachment according to claim 1, wherein said means for releasable closing said first discharge outlet comprises a flush cap.

3. The attachment according to claim 2, wherein said flush cap has an externally threaded end and said lower end of said frother body is internally threaded so that said externally threaded end of said flush cap is threadably receivable within said externally threaded lower end of said lower frother body to close said first discharge outlet.

4. The attachment according to claim 3, wherein said upper frother body has a counterbored threaded hole for holding said flush cap when not in use and when producing frothed hot milk.

5. The attachment according to claim 1, wherein said means for releasably attaching said steam inlet to a steam supply of an espresso machine comprises a pressure fitting cap, a generally rigid bushing, and a generally resilient bushing.

6. The attachment according to claim 5, wherein said means for releasably attaching said steam inlet to a steam supply of an espresso machine comprises an adapter and nut, said adapter comprising a tube having a ball-shaped end.

7. The attachment according to claim 1, wherein said means for introducing milk and air comprises an air adjustment knob in adjustable fluid communication between said air inlet and said third fluid conduit for metering the amount of air introduced into said fluid conduit.

8. The attachment according to claim 7, wherein said air adjustment knob has a threaded stem threadably received in said third fluid conduit and movable between an open and closed position relative to said air inlet so as to control and meter air through said air inlet.

9. The attachment according to claim 1, further comprising a tube, one end of which is to connectable to a milk container and the other end of which is connectable to said milk inlet.

10. The attachment according to claim 9, further comprising a first flow restrictor attached to said one end of said tube, said first flow restrictor positionable in a milk container.

11. The attachment according to claim 10 wherein said first flow restrictor has a V-shaped end for preventing said tube from sealably engaging an inside surface of a milk container.

12. The attachment according to claim 9, further comprising a second flow restrictor disposed in said tube adjacent to said other end thereof.

13. The attachment according to claim 1, wherein said upper frother body, said lower frother body, said frother nozzle, said means for introducing milk and air, and said means for releasably closing said first discharge outlet are fabricated from a plastic material.

* * * * *